(12) United States Patent
Elkins, II et al.

(10) Patent No.: US 7,668,425 B1
(45) Date of Patent: Feb. 23, 2010

(54) BI-DIRECTIONAL CABLE ASSEMBLY WITH BEND-IMPROVED FIBER TETHER

(75) Inventors: Robert Bruce Elkins, II, Hickory, NC (US); Johannes Ian Greveling, Newton, NC (US); Stephen Robert Horan, Jr., Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/266,991

(22) Filed: Nov. 7, 2008

(51) Int. Cl.
*G02B 6/44* (2006.01)
(52) U.S. Cl. ..................... 385/100; 385/109
(58) Field of Classification Search .............. None
See application file for complete search history.

(56) References Cited

U.S. PATENT DOCUMENTS

2007/0009214 A1* 1/2007 Elkins et al. ............ 385/100
2008/0089652 A1* 4/2008 Wells ..................... 385/100

* cited by examiner

*Primary Examiner*—Tina M Wong
(74) *Attorney, Agent, or Firm*—C. Keith Montgomery

(57) ABSTRACT

A bi-directional cable assembly for use with a fiber optic cable that includes at least one cable optical fiber that can carry bi-directional optical signals. The cable assembly is connected to the fiber optic cable at a mid-span location, where the cable fiber is preterminated to form upstream and downstream cable fiber sections. A tether having an upstream and/or a downstream tether fiber is spliced to corresponding preterminated upstream and/or downstream cable fibers at respective one or more splice locations. At least one of the tether fibers is a bend-resistant optical fiber that includes a bend angle equal to or about 180 degrees so that the tether extends in one direction from the mid-span access point along the fiber optic cable. A low-profile protective cover covers the mid-span access point and an end-portion of the tether. A protective tube may be used to house the bend-improved fiber and the splices that connect the cable fiber sections to the tether fibers.

16 Claims, 5 Drawing Sheets

BI-DIRECTIONAL CABLE ASSEMBLY WITH BEND-IMPROVED FIBER TETHER

CROSS-REFERENCE TO RELATED APPLICATIONS

The present application is related to U.S. application Ser. No. 12/267,179, entitled "BI-DIRECTIONAL TAP ASSEMBLIES FOR TWO-WAY FIBER TOPOLOGIES," filed Nov. 7, 2008.

BACKGROUND

1. Technical Field

The present disclosure relates generally to fiber optic cables used in telecommunication systems, and in particular relates to cable assemblies for fiber optic cables, and more particularly relates to bi-directional cable assemblies arranged at mid-span access locations and that have one or more optical fiber tethers.

2. Technical Background

Optical fiber is used for a variety of broadband telecommunication applications that involve voice, video and/or data transmissions. Such fiber-based telecommunication systems utilize fiber optic cables (e.g., "distribution cables") that include a number of mid-span access locations at which one or more optical fibers are terminated and interconnected with a branch cable or a drop cable. The mid-span access locations provide an interconnection point, also referred to as "access point" or "tap point" (or just "tap" for short) from the distribution cable. The interconnection point can include a cable assembly that connects optical fibers in the distribution cable to another location, such as another network distribution cable or termination point, or directly to an end user, commonly referred to as a "subscriber," thereby extending an "all optical" communications network closer to the subscriber. In this regard, fiber optic networks are being developed that deliver "fiber-to-the-curb" (FTTC), "fiber-to-the-business" (FTTB), "fiber-to-the-home" (FTTH), or "fiber-to-the-premises" (FTTP), referred to generically as "FTTx."

An example application of a fiber-based telecommunication system is an intelligent transportation system (ITS) that utilizes sensors and video cameras to monitor traffic conditions. The data from such monitoring are transmitted to a centralized data gathering facility via a fiber optic cable. The typical data gathering network architecture for the ITS is a ring or loop topology that provides bi-directional connectivity to the monitoring equipment. The present approach to connecting the monitoring equipment to the fiber optic cable is to use two taps, each tap having its own separate tether and connector. This arrangement has the disadvantage of requiring that a tether be on both the upstream and downstream directions of the fiber optic cable. The tether facing the direction in which the fiber optic cable is pulled while being installed requires special protection to prevent it from being torn from the fiber optic cable during installation. To date, using a single connector has not been a practical alternative to the two-connector approach because it would require the fiber in the downstream side of the cable access point to be bent back 180 degrees to allow it to fit into the tether of the cable assembly. Conventional optical fiber technology restricts the bending diameter of the fibers in the fiber optic cable to no less than 30 mm to 40 mm to prevent bend-induced attenuation loss in the fiber. Unfortunately, having to preserve large bend radii at the tap point renders the tap point too large to deploy without damaging the tether.

SUMMARY

In accordance with the embodiments described herein, various embodiments of a bi-directional cable assembly that include at least one short length of cable, referred to herein as a "tether," wherein the tether includes at least one bend-improved, such as a bend-tolerant, or bend-insensitive fiber. The tether is attached (e.g., spliced or otherwise optically connected) to an optical fiber of a fiber optical cable at a mid-span location. The mid-span location is also referred to as a "tap point." The bi-directionality of the cable assembly means that at least one "upstream" and at least one "downstream" optical fiber is accessed at the tap, wherein "upstream" and "downstream" are relative terms used to indicate direction in which information travels over the fiber optic cable from one or more reference locations, such as a central office or other types of communications management centers or telecommunication devices. In a bi-directional configuration, a single optical fiber can carry optical signals in both upstream and downstream directions.

Bi-directionality is associated with a ring network topology where a fiber optic cable begins and ends at the same location, e.g., a central office. Bi-directionality also is associated with a non-ring topology where ends of a distribution cable terminate at respective locations that transmit and receive information over the distribution cable. In a bi-directional telecommunications system, at least one optical fiber in the system is configured to carry optical signals in two directions.

The tether of the cable assembly permits at least one connector to be positioned at a desired location in a fiber optic communications network. In an example embodiment, the tether is manufactured in the factory and spliced or otherwise optically connected in the field to a previously installed fiber optic distribution cable. Alternatively, the cable assembly (including a tether and at least one connector) is manufactured in the factory (i.e., factory-prepared) for a pre-engineered fiber optic communications network and wound onto a cable reel for deployment in the field.

While a tether can be of any length, in practice it typically provides a relatively short length of cable (as compared to the distribution cable) to allow a distribution or termination point to be positioned at a desired location. Thus, in various example embodiments, the tether has a length up to 100 feet, more especially of up to 25 feet, and preferably a length of about 5 to about 18 feet. The tether eliminates the need for absolute accuracy in the engineering of the fiber optic network, the manufacture of the distribution cable assembly and the deployment of the distribution cable assembly.

The downstream ends of the one or more optical fibers of the tether ("tether optical fibers") are preferably connectorized with a tether connector, such as with one of the following connector types: SC, LC, DC, FC, ST, SC/DC, MT, MT-RJ, MTP, MPO. Other like single or multi-fiber connectors now known or hereafter developed can also be used.

Accordingly, a first aspect of the invention is a bi-directional cable assembly that includes a fiber optic cable having at least one cable optical fiber adapted to carry bi-directional optical signals and that is preterminated at a mid-span location to form two cable fiber ends. The assembly also includes at least one tether having at least one tether fiber that is optically spliced at a corresponding at least one splice location to at least one of the cable fiber ends at the mid-span location. One of the tether fibers is a bend-improved optical fiber having a bend formed therein so that the at least one tether extends in one direction from the mid-span location along the fiber optic cable. In example embodiments where there are two tethers with one of the tethers having the bend-improved fiber, the two tethers can run in the same direction along the fiber optic cable. In example embodiments where there is a single tether that includes upstream and downstream tether fibers wherein at least one of the tether fibers is a bend-improved fiber, the tether can run in one direction along the fiber because the bend-improved fiber can be bent to accommodate such geometry.

A second aspect of the invention is a bi-directional cable assembly. The assembly includes a fiber optic cable having at least one cable fiber configured to carry optical signals in upstream and downstream directions, wherein the at least one cable fiber is preterminated at a mid-span access location in the fiber optic cable to form corresponding at least one upstream cable fiber section and at least one downstream cable fiber section. The assembly also includes a tether having at least one upstream and at least one downstream tether fiber. The tether fibers are optically connected to respective upstream and downstream cable fiber sections. One or both of the at least one downstream and at least one upstream tether fibers is/are bend-improved optical fibers, wherein one or more of the bend-improved optical fibers include a bend having a bend angle equal to or about equal to 180 degrees, thereby allowing the tether to extend from the mid-span location in one direction along the fiber optic cable. For example, if the downstream tether fibers are the ones to be subjected to significant bending when forming the bi-directional cable assembly, then all of the downstream tether fibers are bend-improved fibers, while the upstream tether fibers may or may not be bend-improved fibers.

Another aspect of the invention is a method of forming a bi-directional tap in a fiber-optic cable that includes at least one cable optical fiber. The method includes, at a mid-span location, preterminating the at least one cable optical fiber to form corresponding at least one upstream and at least one downstream cable fiber sections. The method further includes splicing at least one of the at least one upstream and at least one downstream cable fiber sections to the at least one tether fiber. At least one tether fiber is a bend-improved fiber. The method also includes forming in the at least one bend-improved tether fiber a bend having a bend angle equal to or about 180 degrees. The method further includes extending the tether in one direction along the fiber optic cable from the mid-point location. The method optionally includes forming the bend by forming a loop in the at least one bend-improved tether fiber and inserting the loop into a tube having an inner diameter that defines the bend diameter. The method also optionally includes including forming an overmold over the mid-span location and an end-portion of the tether. In an example embodiment of the method, the tether includes a downstream tether fiber and an upstream tether fiber, where one or both tether fibers are bend-improved.

Additional features and advantages of the invention are set forth in the detailed description that follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description, serve to explain the principles and operations of the invention.

DETAILED DESCRIPTION OF THE PREFERRED EMBODIMENTS

Figure 1:
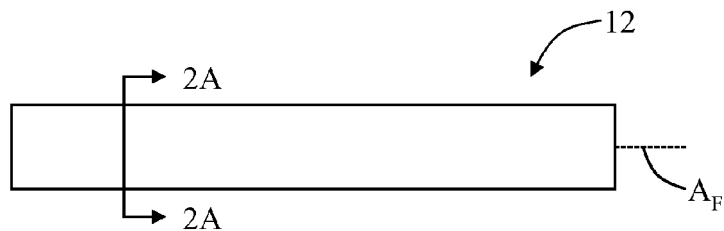
FIG. 1 is a schematic side view of a section of an example embodiment of a bend-improved optical fiber.

Reference is now made in detail to the embodiments of the invention, examples of which are illustrated in the accompanying drawings. Whenever possible, the same reference numbers and symbols are used throughout the drawings to refer to the same or like parts. In the drawings and in the description below, a reference number, letter or symbol ending in "U" or "D" respectively denotes "upstream" or "downstream". A signal traveling from upstream to downstream is referred to as a "downstream signal," and vice versa.

The present invention provides various embodiments of low-profile, flexible bi-directional cable assemblies. Preferred embodiments include a flexible protective cover, such as an overmold, for substantially sealing an exposed portion of the cable created when pre-selected optical fibers are accessed through the cable sheath, are preterminated, and then are spliced to corresponding tether fibers. The term "preterminated" is used herein to refer to an optical fiber that is terminated at a point short of its total installed length.

In the various embodiments described herein, the bi-directional cable assembly of the present invention includes a fiber optic distribution cable comprising at least a cable sheath having a predetermined number of optical fibers contained within. The predetermined number of optical fibers may be individualized, ribbonized, or combinations of each. The distribution cable may further comprise strength members, strength yarns, one or more buffer tubes, and water-swellable tapes or foams, among other known cable components. The cable may have a round or a non-round cross-section. Distribution cable types suitable for use in the present invention include, but are not limited to loose-tube, central-tube, and ribbon-in-central-tube cables, which are available under the trademarked names ALTOS, SST and RPX cables from Corning Cable Systems of Hickory, N.C. Although only one mid-span access location may be shown on a distribution cable for the sake of illustration, it is envisioned that a distribution cable may include more than one such access locations along its length for attaching multiple tethers at multiple access points. Each mid-span access location is used to access and terminate pre-selected optical fibers within the fiber optic (distribution) cable.

Bend-Improved Optical Fibers

The present invention makes use of bend-improved fibers, which can be optical fibers characterized as "bend-tolerant" or "bend-insensitive." Bend-insensitive fibers are generally considered to show the least attenuation under small bend radii. There are a number of such fibers on the market today. For example, exemplary bend-insensitive fibers may have one or more regions with periodically or non-periodically arranged small holes or voids, which make the fiber insensitive to tight bend radii. Examples of fiber having such non-periodic arrays of voids are described in, for example, pending U.S. patent application US20070104437, US20080131066, U.S. Pat. No. 7,433,566 (hereinafter, "the Corning nanostructure fiber patents and patent applications"), all of which are assigned to Corning Incorporated, the specification of each of which is incorporated by reference herein in its entirety.

According to one aspect of the invention, the fibers used can satisfy the requirements for ITU-T (International Telecommunications Union) standard G657.B, which generally requires an optical fiber to operate satisfactorily at a bend radius of 7.5 mm, or even at a bend radius of 5 mm. In this specification, fibers satisfying G657.B are described as "bend-tolerant" fibers.

Bend-insensitive fibers as described herein generally include, for example, nanostructure fibers of the type available from Corning, Inc., of Corning, N.Y., including, but not limited to, single-mode and multi-mode optical fibers. Nanostructure fibers allow for cable assemblies to have aggressive bending with low optical attenuation. One example of a bend-insensitive optical fiber includes a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide bend insensitivity, and single mode operation at wavelengths preferably greater than or equal to 1500 nm, in some embodiments also greater than about 1310 nm, in other embodiments also greater than 1260 nm.

Figure 2A:
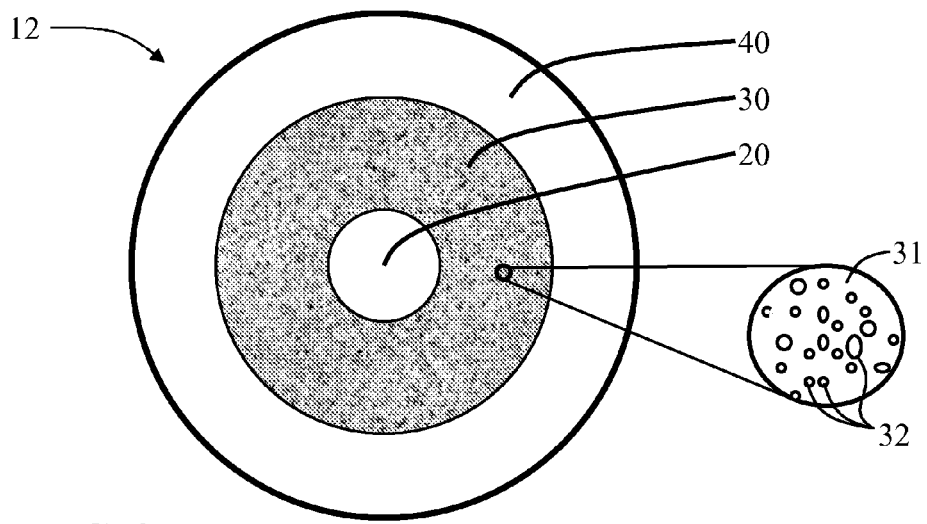
FIG. 2A is a schematic cross-section of the optical fiber of FIG. 1 as viewed along the direction 2A-2A.

FIG. 1 is a schematic side view of a section of an example embodiment of a nanostructure optical fiber ("nanostructure fiber") 12 having a central axis $A_F$. FIG. 2A is a schematic cross-section of nanostructure fiber 12 as viewed along the direction 2A-2A in FIG. 1. Nanostructure fiber 12 can be, for example, any one of the various types of nanostructure optical fibers, such as any of the so-called "holey" fibers, or those described in the above-mentioned Corning nanostructure fiber patents and patent applications. For the purposes of the present invention, a "nanostructure" fiber includes bend-insensitive fibers that make use of periodic or non-periodic nanostructures or holes.

In an example embodiment, nanostructure optical fiber 12 includes a core region ("core") 20, a nanostructure region 30 surrounding the core, and an outer cladding region 40 ("cladding") surrounding the nanostructure region. Other ring-type configurations for nanostructure optical fiber 12 are also known. A protective cover or sheath (not shown) optionally covers outer cladding 40.

In an example embodiment, nanostructure region 30 comprises a glass matrix ("glass") 31 having formed therein non-periodically disposed holes (also called "voids" or "airlines") 32, such as the example voids shown in detail in the magnified inset of FIG. 2A. In another example embodiment, voids 32 may be periodically disposed, such as in a photonic crystal optical fiber, wherein the voids typically have diameters between about $1 \times 10^{-6}$ m and $1 \times 10^{-5}$ m. Voids 32 may also be "non-periodic airlines. In an example embodiment, glass 31 is fluorine-doped while in another example embodiment the glass is undoped pure silica. By "non-periodically disposed" or "non-periodic distribution," it is meant that when one takes a cross-section of the optical fiber (such as shown in FIG. 2A), the voids 32 are randomly or non-periodically distributed across a portion of the fiber.

Cross sections similar to FIG. 2A taken at different points along the length of nanostructure optical fiber 12 will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber (and thus have a longer dimension along the length of the fiber), but do not extend the entire length of the entire fiber for typical lengths of transmission fiber. While not wishing to be bound by theory, it is believed that the holes extend less than a few meters, and in many cases less than 1 meter along the length of the fiber.

If non-periodically disposed holes/voids 32 are employed in nanostructure region 30, it is desirable in one example embodiment that they be formed such that greater than 95% of and preferably all of the holes exhibit a mean hole size in the cladding for the optical fiber which is less than 1550 nm, more preferably less than 775 nm, most preferably less than about 390 nm. Likewise, it is preferable that the maximum diameter of the holes in the fiber be less than 7000 nm, more preferably less than 2000 nm, and even more preferably less than 1550 nm, and most preferably less than 775 nm In some embodiments, the fibers disclosed herein have fewer than 5000 holes, in some embodiments also fewer than 1000 holes, and in other embodiments the total number of holes is fewer than 500 holes in a given optical fiber perpendicular cross-section. In an example embodiment, holes/voids 32 can contain one or more gases, such as argon, krypton, nitrogen, or oxygen. Alternatively, or in addition, as mentioned above the depressed index can also be provided by downdoping the glass in the hole-containing region (such as with fluorine) or updoping one or both of the surrounding regions.

The nanostructure optical fibers disclosed herein may or may not include germania or fluorine to adjust the refractive index of the core and/or cladding of the optical fiber, but these dopants can also be avoided in the intermediate annular region and instead, the holes (in combination with any gas or gases that may be disposed within the holes) can be used to adjust the manner in which light is guided down the fiber core. The nanostructure region may consist of undoped (pure) silica, thereby completely avoiding the use of any dopants in the hole-containing region, to achieve a decreased refractive index, or the nanostructure region may comprise doped silica, e.g. fluorine-doped silica having a plurality of holes. In one set of embodiments, the core includes doped silica to provide a positive refractive index relative to pure silica, e.g. germania doped silica. The core region is preferably hole-free.

Such fiber can be made to exhibit a fiber cut-off of less than 1400 nm, more preferably less than 1310 nm, a 20-mm macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12-mm macrobend induced loss at 1550 nm of less than 5 dB/turn, preferably less than 1 dB/turn, more preferably less than 0.5 dB/turn, even more preferably less than 0.2 dB/turn, still more preferably less than 0.01 dB/turn, still even more preferably less than 0.05 dB/turn, and an 8-mm macrobend induced loss at 1550 nm of less than 5 dB/turn, preferably less than 1 dB/turn, more preferably less than 0.5 dB/turn, and even more preferably less than 0.2 dB-turn, and still even more preferably less than 0.1 dB/turn.

The nanostructure fibers used herein may be multimode. Such fibers may comprise, for example, a graded-index core region and a cladding region surrounding and directly adjacent to the core region, the cladding region comprising a depressed-index annular portion comprising a depressed relative refractive index, relative to another portion of the cladding (which preferably is silica which is not doped with an index of refraction altering dopant such as germania or fluorine). The depressed-index annular portion may comprise glass comprising a plurality of holes, fluorine-doped glass, or fluorine-doped glass comprising a plurality of holes. The depressed index region can be adjacent to or spaced apart from the core region.

In an example embodiment, the multimode nanostructure optical fiber exhibits very low bend-induced attenuation, in particular very low macrobending. In some embodiments, high bandwidth is provided by low maximum relative refractive index in the core, and low bend losses are also provided. In some embodiments, the core radius is large (e.g. greater than 20 µm), the core refractive index is low (e.g. less than 1.0%), and the bend losses are low. In an example embodiment, the multimode nanostructure optical fiber exhibits a spectral attenuation of less than 3 dB/km at 850 nm.

In an example embodiment, the numerical aperture (NA) of the nanostructure optical fiber used herein is preferably greater than the NA of the optical source directing signals into the fiber; for example, the NA of the optical fiber is preferably greater than the NA of a VCSEL light source. The bandwidth of the multimode optical fiber varies inversely with the square of $\Delta 1_{MAX}$. For example, a multimode optical fiber with $\Delta 1_{MAX}$ of 0.5% can yield a bandwidth 16 times greater than an otherwise identical multimode optical fiber except having a core with $\Delta 1_{MAX}$ of 2.0%. In some embodiments, the core extends radially outwardly from the centerline to a radius R1, wherein $12.5 \leq R1 \leq 40$ microns. In some embodiments, $25 \leq R1 \leq 32.5$ microns, and in some of these embodiments, R1 is greater than or equal to about 25 microns and less than or equal to about 31.25 microns. The core preferably has a maximum relative refractive index less than or equal to 1.0%. In other embodiments, the core has a maximum relative refractive index less than or equal to 0.5%. Such multimode fibers preferably exhibit a 1-turn 10 mm diameter mandrel attenuation increase of no more than 1.0 dB, preferably no more than 0.5 dB, more preferably no more than 0.25 dB, even more preferably no more than 0.1 dB, and still more preferably no more than 0.05 dB, at all wavelengths between 800 and 1400 nm.

Alternatively, the bend-improved fiber could employ a fluorine-doped trench or moat region, which is typically spaced from the core of the fiber, such as is described in US Patent Application Nos. 20080056654, 20080056658 and 20080166094, the specification of each of which is incorporated by reference herein in its entirety. Alternatively, the bend-improved fiber could employ a hole assisted design, which involves 3-10 periodically disposed holes arranged (typically periodically) around the core of the fiber. The holes in the hole-assisted bend-improved fibers typically travel the entire length of the optical fiber.

Fiber Bend Angle and Bend Diameter

Figure 2B:
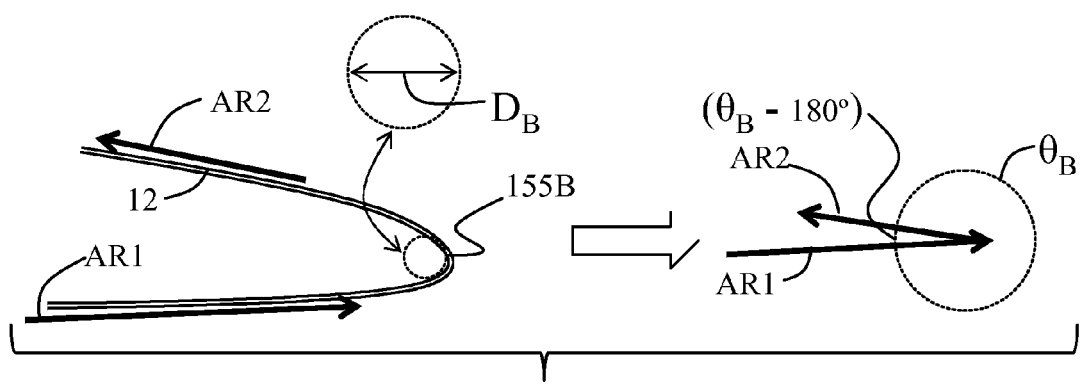
FIG. 2B is a schematic diagram illustrating the bend angle $\theta_B$ and the bend diameter $D_B$ of a bend formed in the optical fiber of FIG. 1.

FIG. 2B is a schematic diagram illustrating a bend angle $\theta_B$ and a bend diameter $D_B$ of an example bend-improved optical fiber in the form of bend-insensitive nanostructure fiber 12 having a bend formed therein. Bend diameter $D_B$, which is also used below, is twice the bend radius $R_B$. Two arrows AR1 and AR2 represent the relative orientations (directions) of optical fiber 12 before (e.g., "upstream of") and after (e.g., "downstream of") bend 155B. Bend angle $\theta_B$ is defined by the intersection of arrows AR1 and AR2, as shown in the right-hand side of FIG. 2B. Because sections of optical fiber do not always remain perfectly straight before and after a bend, the bend angle $\theta_B$ is not exact, but serves as a useful approximation that generally describes the degree to which nanostructure fiber 12 is bent.

Figure 4A:
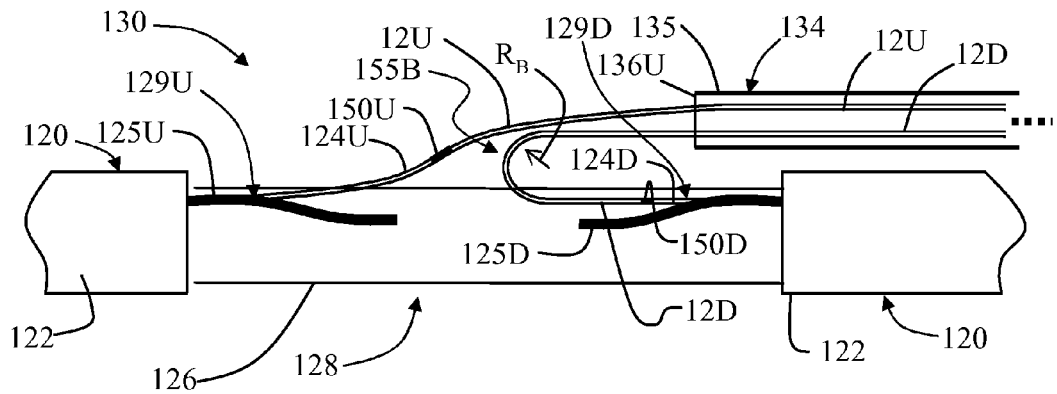
FIG. 4A is a schematic close-up view of a first example embodiment of a bi-directional cable assembly according to the present invention.
Figure 6:
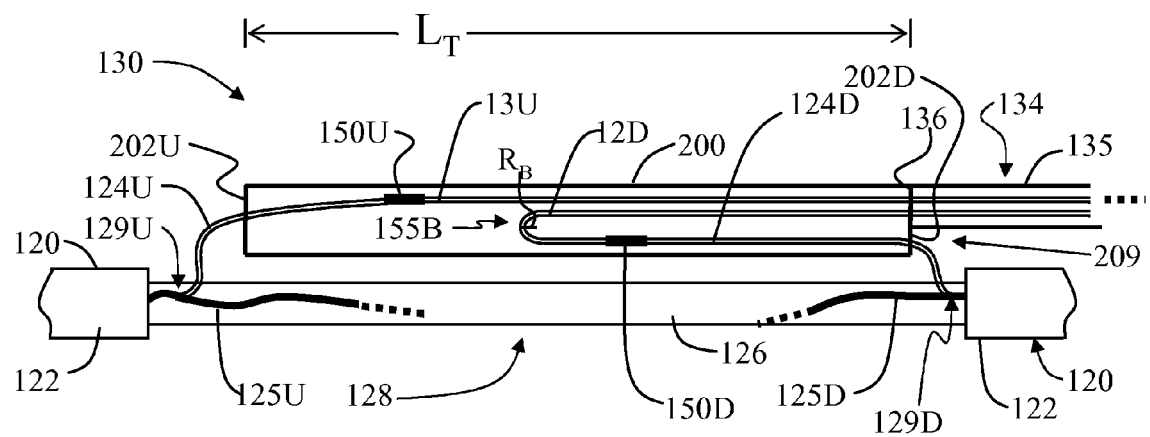
FIG. 6 is a schematic close-up view of a second example embodiment of a bi-directional tap assembly that utilizes a protective tube to house a bent tether fiber so that the tether can extend in one direction from the protective cover.
Figure 7:
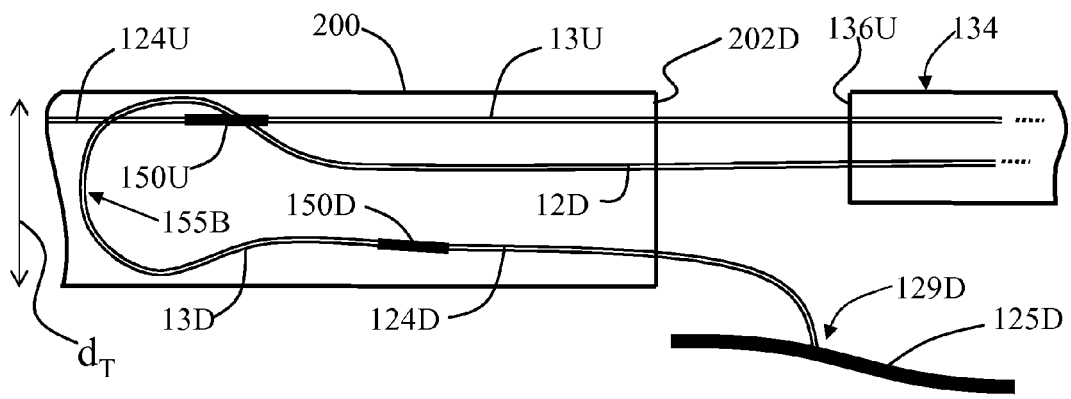
FIG. 7 is a close-up view of the downstream end of the protective tube of FIG. 6, showing the loop formed in the fiber within the protective tube.

In example embodiments discussed below, a bend angle $\theta_B$ described as being "equal to or about equal to 180 degrees" is used to describe a bend wherein the fiber doubles back on itself. Such examples are discussed below in connection with FIG. 4A, FIG. 6 and FIG. 7. FIG. 4A and FIG. 6 show idealized examples of bends where $\theta_B = 180$ degrees, while FIG. 7 shows a more realistic version of such a bend formed by looping the fiber.

Telecommunication System with Bi-Directional Cable Assembly

Figure 3A:
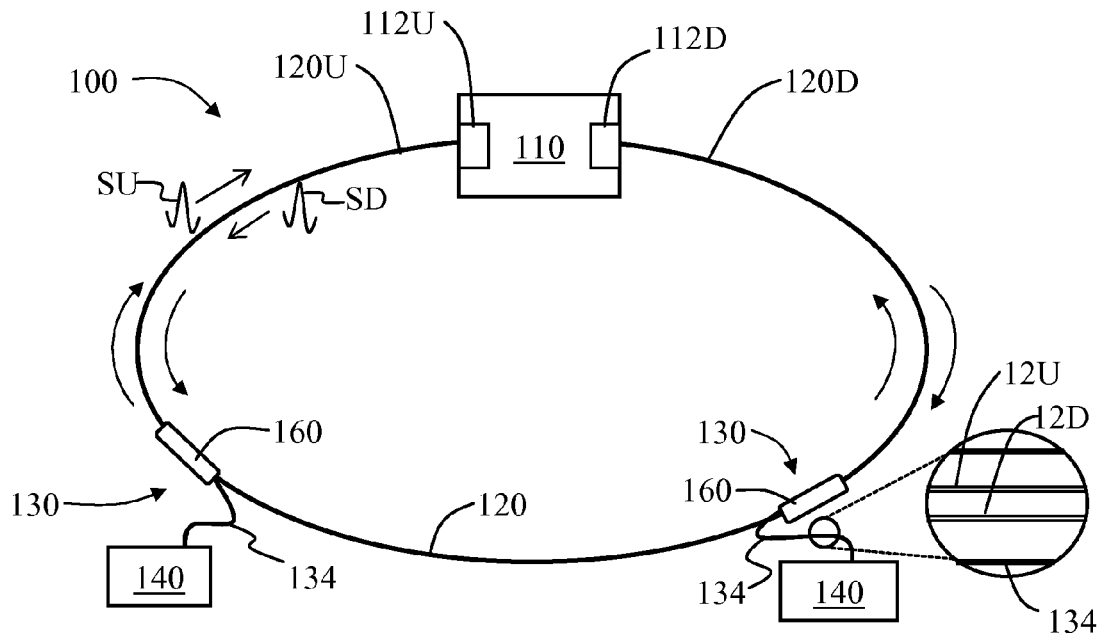
FIG. 3A is a schematic diagram of a bi-directional telecommunication system having a ring-topology and that includes a fiber optic cable with two bi-directional cable assemblies arranged at respective mid-span access locations.

FIG. 3A is a schematic diagram of an example telecommunication system 100 having a central station 110 that includes two transmitting/receiving (T/R) units 112U and 112D. System 100 includes a fiber optic cable 120 (e.g., a distribution cable) having first and second ends 120U and 120D respectively optically coupled to uplink and downlink T/R units 112U and 112D, thereby forming a ring topology. Fiber optic cable 120 carries a number of optical fibers 124 (not shown in FIG. 3A; see FIG. 4A). These fibers are referred to herein as "cable fibers". Optical signals carried by cable fibers can travel from central station 110 in both directions as uplink and downlink signals SU and SD, as shown. Note that uplink signal SU travels toward uplink T/R unit 112U and downlink signals SD travel toward downlink T/R unit 112D.

Cable 120 includes at least one bi-directional cable assembly 130 according to the present invention. Various embodiments of bi-directional cable assembly 130 are discussed in greater detail below. Two bi-directional cable assemblies 130 at two different mid-span locations are shown in FIG. 3A for the sake of illustration. Each cable assembly 130 preferably includes a protective cover 160 (discussed below), and at least one tether 134. In an example embodiment, tether 134 is preconnectorized (see FIG. 4B, discussed below). In an example embodiment, tether 134 includes at least one bend-insensitive optical fiber section 12. In the inset of FIG. 3A, tether 134 is shown as including two bend-insensitive optical fibers 12U and 12D by way of example, wherein fiber 12U represents an "upstream" fiber and fiber 12D represents a "downstream" fiber. Note, however, that fiber 12U need not be a bend performance fiber when this fiber is not intended to have a strong bend. Optical fiber sections 12U and 12D are also referred to hereinbelow as "tether fibers" to differentiate from the cable optical fibers carried by fiber optic cable 120.

In an example embodiment, system 100 further includes at least one external device 140 optically coupled to one or more of tethers 134. External device 140 may be, for example, a traffic monitoring device that produces traffic monitoring data in the form of optical data signals provided to central station 110 via optical fiber tether 134 and fiber optic cable 120. External device 140 (e.g., a camera for traffic monitoring) may also be adapted to receive command signals from central station 110, as well as signals from another external device 140.

Figure 3B:
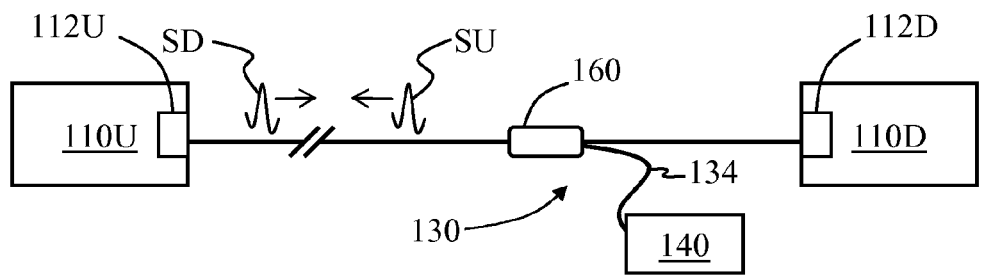
FIG. 3B is a schematic diagram of a linear bi-directional telecommunication system that includes a fiber optic cable with a single bi-directional cable assembly arranged at a mid-span access location.

FIG. 3B is a schematic diagram of an example embodiment of another bi-directional telecommunication system 100 that utilizes a linear topology. System 100 of FIG. 3B includes two end-stations 110U and 110D that respectively include upstream and downstream T/R units 112U and 112D. The T/R units are optically coupled by fiber optic cable 120. A single bi-directional cable assembly 130 at one mid-span location is shown by way of illustration. Upstream and downstream T/R units 112U and 112D exchange uplink and downlink optical signals SU and SD, which can also be tapped and re-directed using bi-directional cable assembly 130, as described in greater detail below.

Figure 3C:
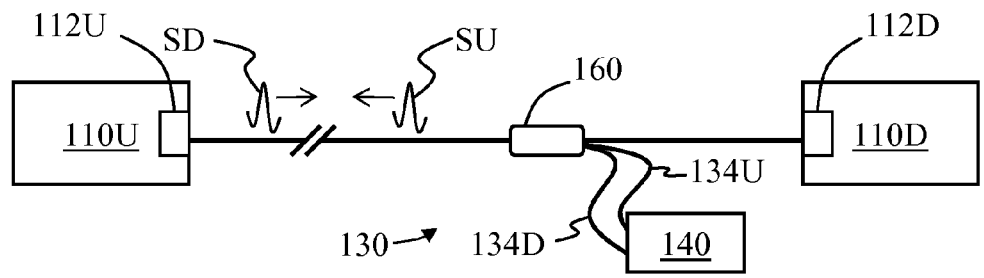
FIG. 3C is a schematic diagram similar to FIG. 3B, but illustrating an example embodiment wherein separate uplink and downlink tethers are used in the bi-directional cable assembly.

FIG. 3C is a schematic diagram similar to FIG. 3B, but illustrating an example embodiment wherein cable assembly 130 utilizes separate uplink and downlink tethers 134U and 134D. Tether 134U includes a non-bend-improved tether fiber section 13U (not shown; see FIG. 4C) optically coupled (e.g., spliced) to the uplink cable fiber 124U, and wherein tether 134D includes a bend-improved tether fiber section 12D (see FIG. 4C) optically coupled (e.g., spliced) to the downlink cable fiber 124D. Tethers 134U and 136D exit protective cover 160 on the same size and at least initially run in the same direction. In an example embodiment, one or both of tethers 134U and 134D are connectorized. Two-tether example embodiments for bi-directional cable assembly 130 are discussed in greater detail below.

First Example Bi-Directional Tap

FIG. 4A is a schematic close-up view of a first example embodiment of the bi-directional cable assembly 130. Fiber optic cable 120 as shown is a loose-tube cable that includes an outer cover or sheath 122 and a number of cable fibers 124 contained in helically stranded buffer tubes 125. Buffer tubes 125 can contain one or more cable fibers 124. Only two buffer tube sections 125U and 125D are shown in FIG. 4A for ease of illustration. In one example embodiment, buffer tube sections 125U and 125D are different sections of the same buffer tube 125, while in another example embodiment these sections are associated with different buffer tubes.

Bi-directional tap 130 is formed by removing a portion of outer cover (sheath) 122 at one or more mid-span access locations to create at least one exposed region 128 wherein buffer tubes 125 and cable fibers 124 therein can be accessed. In an example embodiment, at least one of cable fibers 124 carries optical signals that travel in both the upstream and downstream directions. One such cable fiber 124 is identified in FIG. 4A and includes upstream and downstream sections 124U and 124D for the sake of reference.

To create bi-directional tap 130, a buffer tube 125 that carries cable fiber 124 is identified in exposed region 128. The identified buffer tube 125 is then partially extracted from the bundle of buffer tubes carried by fiber optic cable 120. Upstream and downstream cable fiber sections 124U and 124D are then extracted from buffer tube 125 at one or more access points, such as respective upstream and downstream access points 129U and 129D.

In an example embodiment, the process of extracting upstream and downstream cable fiber sections 124U and 124D may involve, for example, making a mid-point cut in the buffer tube to cut the fiber therein so that it can be extracted from the access point. To create an access point on a cable containing at least one buffer tube, an appropriate buffer tube may be accessed in multiple places using a standard No-Slack Optical Fiber Access Tool (NOFAT) available from Corning Cable Systems LLC of Hickory, N.C. The NOFAT tool is suitable for use in locations in which a limited amount of cable slack can be obtained and the buffer tubes remain helically wrapped around a central member.

Extracted cable fiber sections 124U and 124D each now have a terminal end. While this selected cable optical fiber 124 is preterminated to form the upstream and downstream cable fiber sections, the other uncut cable fibers 124 remain intact and continue through the distribution cable, possibly being preterminated at another access point. In some embodiments, a water-blocking wrap and/or a protective layer may be added around the access location prior to forming the protective cover, as described below.

The extracted cable fiber sections 124U and 124D are optically connected (e.g., spliced, such as fusion-spliced) at splice locations ("splices") 150U and 150D to respective tether fibers—here illustrated as bend-insensitive optical fiber sections 12U and 12D. A bend 155B having a bend radius $R_B$ and a bend angle $\theta_B$ equal to or about equal to 180 degrees is formed in downstream optical fiber section 12D so that this tether fiber travels in the same direction as upstream tether fiber section 12U. Portions of tether fiber sections 12U and 12D are then enclosed in a tether cover 135 to form tether 134. Tether cover 135 has an upstream end 136U where tether fiber sections 12U and 12D enter tether 134. In an example embodiment, $5\text{ mm} \leq R_B \leq 10\text{ mm}$.

Figure 4B:
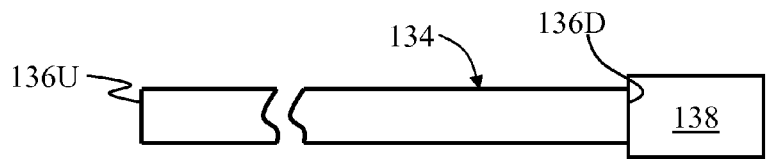
FIG. 4B is a close-up view of the downstream end of a connectorized embodiment of the tether of FIG. 4A.

With reference to FIG. 4B, in an example embodiment, tether 134 includes a downstream end 136D that is pre-connectorized, e.g., terminates in at least one connector 138, such as a single fiber connector, duplex connector or multi-fiber connector. Common multi-fiber connectors 138 include 4-fiber, 6-fiber, 8-fiber and 12-fiber connectors. In an example embodiment, connector 138 is configured to connect tether 134 to external device 140, such as illustrated in FIG. 3A through FIG. 3C.

An example method for connecting tether 134 and upstream and downstream tether fibers 12U and 12D therein to fiber optic cable 120 and respective upstream and downstream cable fiber sections 124U and 124D therein involves exposing the appropriate buffer tube 125 and forming therein the aforementioned upstream and downstream access points 129U and 129D about 12" apart. Individual cable fiber sections 124U and 124D are cut at the second buffer tube opening 129D and pulled out of the buffer tube at the first tube opening 125U. The upstream and downstream cable fiber sections 124U and 124D are then optically connected (e.g., spliced) to the respective upstream and downstream tether fibers 12U and 12D.

In another example embodiment of accessing a select cable fiber 124 in buffer tube 125, a length of fiber optic cable 20 is exposed to create an exposed region 128 large enough to allow for three openings to be made in the buffer tube: upstream and downstream openings or access points 129U and 129D, and a mid-point opening or access point (not shown) between the upstream and downstream access points. These openings can be, for example, about 10" apart, in which case an additional 10" of cable needs to be opened as compared to using just two access points 129U and 129D. The mid-point opening point is used to cut the fiber, and the upstream and downstream openings 129U and 129D are used to pull the upstream and downstream cable fiber sections 124U and 124D out of the buffer tube 125 in both directions.

Figure 4C:
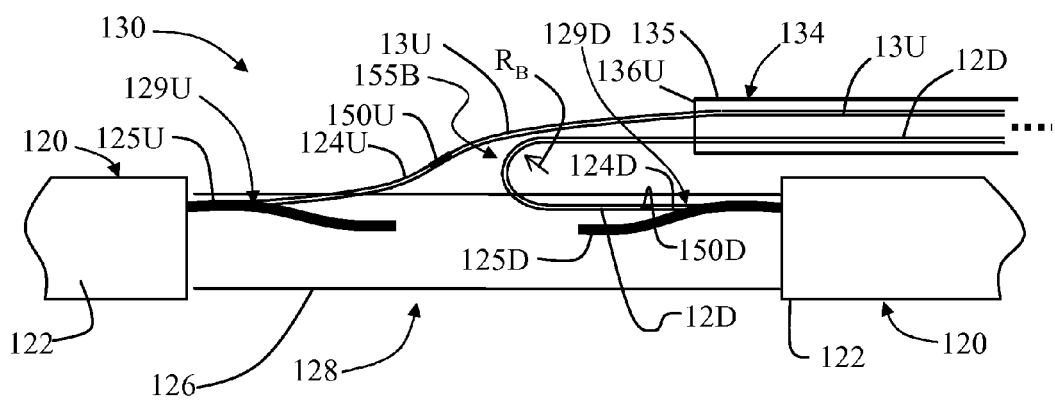
FIG. 4C is similar to FIG. 4B, but illustrates an example embodiment in which the upstream tether fiber section that does not have a substantial bend is a non-bend-improved optical fiber.

FIG. 4C is similar to FIG. 4B, and illustrates an example embodiment of the bi-directional cable assembly 130 wherein the upstream tether fiber which does not undergo significant bending is a not a bend-improved fiber identified, and is identified by reference number 13U to distinguish from bend-improved fiber 12U of the example embodiment of FIG. 4B.

Figure 5:
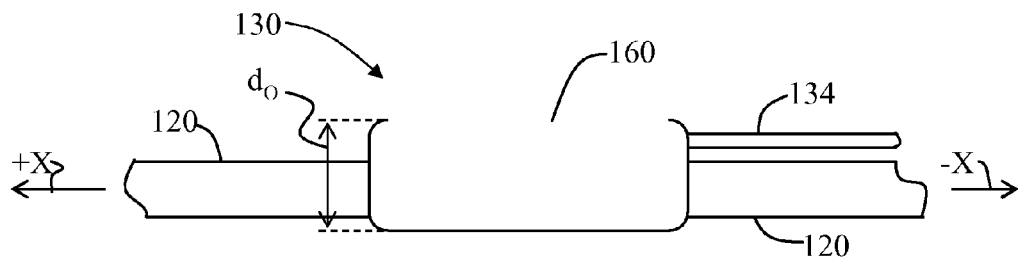
FIG. 5 is a schematic side view of the bi-directional cable assembly of FIG. 4A, in which the assembly includes a low-profile protective cover, and the tether passes through one side of the protective cover and runs along the fiber optic cable in the downstream direction.

FIG. 5 is a schematic side view of a bi-directional cable assembly 130, wherein the tap is covered by a protective cover 160, such an overmolded portion or a clam-shell-type housing. In an example embodiment, protective cover 160 is formed by an overmolding process that includes preparing the sheath of the distribution cable, such as by cleaning and roughening, flame preparing or chemically preparing the surface. The assembly is placed into an overmolding tool and a flowable overmolding material is introduced into a mold cavity defined by the molding tool. The final overmold preferably has a low profile, e.g., an outer diameter do sufficiently small to allow the assembly to be installed in buried and aerial networks through any conduit or duct, or over aerial installation sheave wheels and pulleys. Intrinsic properties of the overmold material contribute to its flexibility, and in some embodiments, the geometric shape of the overmold and the positioning of strength components and bend elements within contribute to controlled stiffness. In an example embodiment, overmold diameter do is preferably in the range from about 25 mm to about 50 mm, and more preferably is in the range from about 34 mm to about 50 mm.

Because fiber section 12D of tether 134 is a bend-insensitive optical fiber, it can have a very small bending radius $R_B$, e.g., $R_B=5$ mm (see FIG. 4A). In an example embodiment, 5 mm $\leq R_B \leq$ 10 mm. This allows for cover 160 to be relatively compact and have a relatively low profile with respect to fiber optic cable 120, which is important in fiber optic cable deployment. It also allows for both tether fibers 12U and 12D (and thus tether 134) to extend in a single direction along fiber optic cable 120. This is also very advantageous for fiber optic cable deployment, since it allows the tether to extend in a direction (say, the –X direction) opposite to the direction (say, the +X direction) of fiber cable deployment, as indicated by the respective arrows in FIG. 5. This greatly reduces the chances of tether 134 being caught on a protrusion or other obstacle and getting pulled out from bi-directional cable assembly 130 during the deployment of fiber optic cable 120.

Second Example Bi-Directional Tap

FIG. 6 is a schematic close-up view of a second example embodiment of bi-directional cable assembly 130. Only one upstream buffer tube 125U and one downstream buffer tube 125D are shown in cable 120 in FIG. 6 for the sake of illustration. The bi-directional tap of FIG. 6 is similar to that of FIG. 4C, except that splices 150U and 150D and portions of the spliced fibers are housed in a protective tube 200 that includes upstream and downstream ends 202U and 202D, and that has an inner diameter $d_T$ that defines bend diameter $D_B$ and that also maintains fiber bend 155B to have a bend angle $\theta_B$ equal to or about equal to 180 degrees. In an example embodiment, inner diameter $d_T$ is in the range from about 10 mm to about 15 mm. Protective tube 200 has a length $L_T$ that can vary widely. In one example cable assembly 130, the inventors used a protective tube 200 having a length $L_T$ of about 300 mm.

In the example configuration of FIG. 6, upstream cable fiber section 124U enters tube upstream end 202U, while downstream cable fiber section 124D enters tube downstream end 202D. Non-bend-improved tether fiber 13U and bend-improved tether fiber 12D both exit tube downstream end 202D. This is accomplished by providing bend 155B in tether fiber 12D within tube 200. In an example embodiment, the inside diameter of protective tube 200 is adequate to allow looped-back fiber 12D to have a bend diameter $D_B$ (=$2R_B$) of no less than 10 mm to ensure that there are no excessive stresses on tether fiber 12D that could lead to reliability problems. In an example embodiment, tether upstream end 136U is arranged adjacent to (e.g., immediately adjacent to) tube downstream end 202D to receive tether fibers 12U and 12D. In an example embodiment, a space 209 is provided at tube downstream end 202D for downstream cable fiber section 124D to enter the tube, as shown in FIG. 6.

Method of Forming Bi-Directional Cable Assembly

An example method of forming the bi-directional cable assembly 130 of FIG. 6 is as follows. The first step includes preparing tether 134 such that there is an extra length for all of the downstream tether fibers 12D to be connected to all of the downstream cable fiber sections 124D. This extra length may be, for example, approximately 3". The next step includes forming the needed number of upstream and downstream cable fiber sections 124U and 124D from one or more buffer tubes 125, as described above. The next step includes forming an upstream fiber splice 150U for each upstream cable fiber/tether fiber pair using standard fusion splicing techniques. The next step includes sliding protective tubing 200 (upstream end first) over the one or more splices 150U.

The next step includes identifying one or more tether fibers 12D to be connected to the corresponding one or more downstream cable fiber sections 124D. The next step includes splicing the one or more downstream cable fiber sections 124D to the one or more tether fibers 12D and putting a splice protector on each downstream fiber splice 150D. The next step includes sliding protective tubing 200 downstream-wise toward the tether upstream end 136U as far as possible, while leaving some space (e.g., 2") to work with the fibers between tether 134 and downstream fiber access point 129D.

With reference now also to FIG. 7, the next step includes looping each spliced downstream fiber/tether fiber so that downstream splice 150D is between the loop (which forms bend 155B) and downstream access point 129D. Bend 155B is formed in the one or more bend-insensitive downstream tether fibers 12D. The next step includes pushing the one or more looped tether fibers 12D into protective tube 200 at downstream end 202D until the spliced fibers are taut. This maintains a fiber bend diameter $D_B=d_T$ and also maintains the fiber bend angle $\theta_B$ to be equal to or about 180 degrees.

The next step includes sliding protective tube 200 so that it is centered between the upstream and downstream access points 129U and 129D in fiber optic cable 120. Cable assembly 130 can now be completed using standard techniques. In an example embodiment, cover 160 is formed over exposed region 128 and covers at least a portion of tube 200 and optionally a portion of tether 134 at tether upstream end 136U.

If the total number of cable fibers 124 being accessed is six or less (meaning total of 12 or less fibers passing through the tether), they can be connected into a single MT style multifiber connect. If more than six fibers are being accessed, then the cable fibers from each direction of the cable can be put into their own tether (two tethers from one tap point, each with its own connector terminal).

Two-Tether Embodiment

Figure 8:
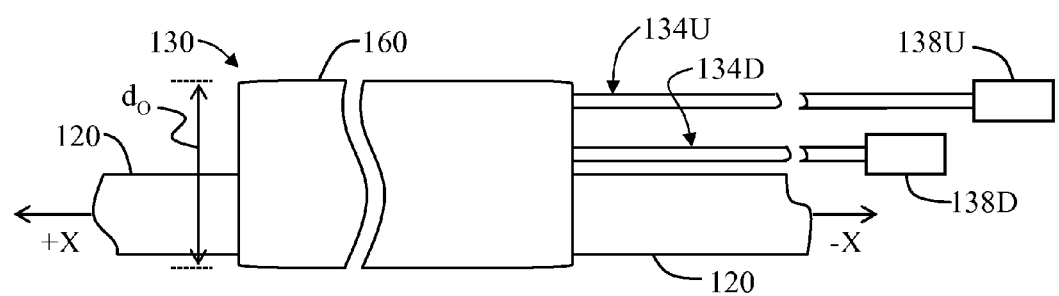
FIG. 8 is a schematic diagram similar to FIG. 5, illustrating an example embodiment similar to that shown in FIG. 3C, wherein two separate downlink and uplink tethers running in the same direction are used rather than a single tether that includes both downlink and uplink tether fiber sections.

An example embodiment of bi-directional cable assembly 130 includes an uplink tether 134U and a downlink tether 134D, as discussed above in connection with FIG. 3C. FIG. 8 is a schematic diagram similar to FIG. 5, illustrating an example embodiment wherein cable assembly 130 includes two separate uplink and downlink tethers 134U and 134D that respectively contain one or more uplink and one or more downlink tether fibers, rather than a single tether 134 that includes both one or more uplink and one or more downlink tether fiber sections 12D and 13U as shown in FIG. 6. Uplink and downlink tethers 134U and 134D are shown connectorized with respective connectors 138U and 138D.

Figure 9:
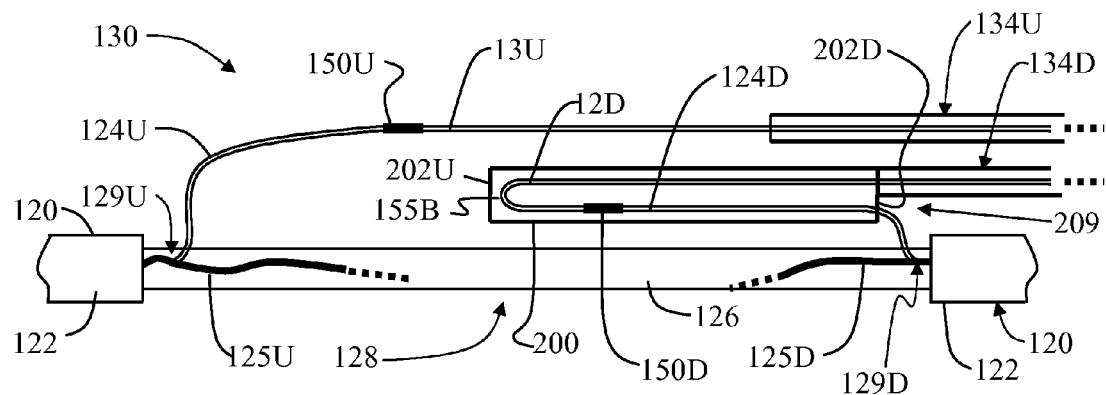
FIG. 9 is a schematic diagram similar to FIG. 6, illustrating an example embodiment of a configuration for the two-tether cable assembly of FIG. 8.

FIG. 9 is a schematic diagram similar to FIG. 6, showing in more detail an example configuration of the two-tether cable assembly 130 of FIG. 8. In the cable assembly 130 of FIG. 9, uplink cable fiber 124U is connected to a non-bend-improved uplink tether fiber 13U of uplink tether 134U, while downlink cable fiber 124D is connected to a bend-improved downlink tether fiber 12D of downlink tether 134D, wherein bend 155B is maintained using protective tube 200. Note that in the example shown in FIG. 9, protective tube 200 can have a closed end 202U since uplink cable fiber 124 need not pass through the protective tube.

Protective Cover

In an example embodiment, the above-described protective cover 160 is or includes an overmold. The overmold is preferably flexible so that when it is combined with a flexible fiber optic cable, it provides a flexible cable assembly that is durable yet sufficiently flexible so as to permit installation using known installation methods and equipment. In contrast to rigid enclosures, a flexible overmold is bendable and twistable and may be installed around installation pulleys and within a small diameter conduit while maintaining structural integrity, sealing, and optical and mechanical performance.

An exemplary overmolding process includes: (i) arranging portions of the cable assembly about a network access point in, for example, a cavity made by a molding tool, die or die-casting; (ii) introducing a curable material in fluid form into the cavity, the fluid essentially flooding the cavity, penetrating interstices around and about the assembly, and essentially covering the assembly; and (iii) curing the curable material within suitable curing conditions. Exemplary molding processes include, but are not limited to, pour and injection molding, pressure molding, and die casting. Alternative exemplary processes may include vacuum and heat forming processes.

Also, the overmold can be applied by extruding a flexible closure material while pulling the assembly through a die. The overmold is preferably a monolithic form. Beneath the overmold material may be disposed a flexible cover material, for example a paper, plastic, tape or wrapping material, to cover at least a portion of the assembly prior to applying the molding material so that the material will not directly contact components. In other embodiments, the molding material may directly contact the underlying components.

Exemplary overmold materials may include polyurethanes, silicones, thermoplastics, thermosets, elastomers, UV curable materials and like materials taken alone or in combination. The overmold may further include additives, plasticizers, flame retardant additives, dyes and colorants. Overmold flexibility and crush-resistance may be enhanced or relaxed based upon application. The term "curable" may include thermoplastic hardening, chemical additive curing, catalyst curing including energy curing as by heat or light energy, and phase changes. The overmold can also be formed using heat-shrink tubing.

In the example embodiments described above, the overmold can be bent with a force about equal to the force required to bend the fiber optic cable itself (the cable to which the overmold is attached) without the overmold attached.

Compared to prior art conventional cable assemblies and processes, the bi-directional cable assembly of the present invention eliminates the cost and risk associated from having to utilize two access locations each having separate cable assemblies. It also reduces the length and bulk of the bi-directional tap point and reduces the cost. It provides for one or more tethers that can be positioned on the one side of the tap point opposite to the direction the fiber optic cable is pulled when being deployed. This eliminates the risk associated with cable installation of a counter-direction tether. It also provides a single connection point for the monitoring equipment, thereby simplifying field connectivity. The cable assembly can also be made to have a low profile, which is also advantageous when deploying the fiber optic cable. The embodiments that include a single tether that include both uplink and downlink tether fibers also provides for bi-directional connectivity using a single tether.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A bi-directional cable assembly, comprising:
   a fiber optic cable that includes a sheath and at least one cable optical fiber adapted to carry bi-directional optical signals and that is preterminated at a mid-span location to form two cable fiber ends;
   at least one tether having at least one uplink tether fiber and at least one downlink tether fiber, the tether fibers being optically spliced at least one splice location to at least one of the cable fiber ends at the mid-span location; and
   a protective cover that covers the mid-span location and end portions of the tether fibers, wherein
   at least one tether fiber is a bend-improved optical fiber having a bend formed therein so that the at least one tether extends in one direction from the mid-span location along the fiber optic cable.

2. The assembly of claim 1, wherein the protective cover comprises a tube that surrounds the at least one splice location and the bend in the bend-improved tether fiber.

3. The assembly of claim 1, wherein the at least one tether is connectorized.

4. The assembly of claim 1, wherein the bend in the bend-improved fiber has a bend radius $R_B$, wherein 5 mm$\leq R_B \leq$10 mm.

5. The assembly of claim 1, wherein the at least one bend-improved tether fiber is bend-tolerant.

6. The assembly of claim 1, further comprising a tether cover that covers at least a portion of both tether fibers.

7. A bi-directional cable assembly, comprising:
   a fiber optic cable having a sheath and at least one cable fiber configured to carry optical signals in upstream and downstream directions, wherein the at least one cable fiber is preterminated at a mid-span access location in the fiber optic cable to form corresponding at least one upstream cable fiber section and at least one downstream cable fiber section;
   a tether having at least one upstream tether fiber and at least one downstream tether fiber, the tether fibers being optically connected to respective upstream and downstream cable fiber sections, wherein one or both of the at least one downstream and at least one upstream tether fibers is/are bend-improved optical fibers; and
   a protective cover that covers end portions of the tether fibers, wherein
   one or more of the bend-improved optical fibers include a bend having a bend angle equal to or about equal to 180 degrees so as to allow the tether to extend from the mid-span location in one direction along the fiber optic cable.

8. The assembly of claim 7, wherein:
   the at least one preterminated upstream and at least one downstream cable fiber sections include respective preterminated ends; and
   the at least one upstream and downstream tether fibers are spliced to the at least one upstream and at least one downstream cable fiber sections at respective at least one upstream and at least one downstream splices.

9. The assembly of claim 8, wherein the protective cover surrounds the mid-span access location and the downstream and upstream splices.

10. The assembly of claim 8, wherein the protective cover includes an overmold.

11. The assembly of claim 8, wherein the protective cover comprises a tube having opposite ends and an inner diameter, wherein the tube surrounds the at least one upstream and at the least one downstream splices, and wherein one of the tether fibers has a bend that resides within the tube and that is configured so that both tether fibers exit one end of the tube.

12. The assembly of claim 11, wherein the tether fiber bend is defined by the tube inner diameter $d_T$, and wherein 10 mm$\leq d_T \leq$20 mm.

13. The assembly of claim 11, further comprising a tether cover that covers at least a portion of both tether fibers.

14. The assembly of claim 7, wherein the fiber bend has a bend radius $R_B$, wherein 5 mm$\leq R_B \leq$10 mm.

15. The assembly of claim 7, wherein the tether is connectorized.

16. The assembly of claim 7, wherein the bend-improved optical fibers are bend-tolerant.

* * * * *